April 18, 1939. F. W. TURNBULL 2,155,106

ICE CREAM CONE

Filed Feb. 7, 1935

INVENTOR
F. W. Turnbull
BY
Henry Savage
ATTORNEY

Patented Apr. 18, 1939

2,155,106

UNITED STATES PATENT OFFICE 2,155,106

ICE CREAM CONE

Francis W. Turnbull, Chattanooga, Tenn., assignor to Turnbull Cone & Machine Company, Chattanooga, Tenn., a corporation of Tennessee Application February 7, 1935, Serial No. 5,373

5 Claims. (Cl. 99—89)

My invention relates to ice cream cones and particularly to an ice cream cone or other cup pastry that has a reinforced top to prevent breakage and an improved means to prevent wedging and splitting of the cones or cup pastry when nested together for packing and shipping.

Ice cream cones are an important article of manufacture and commerce, now being manufactured and shipped throughout the United States and many foreign countries, the number consumed annually in the United States alone, being numbered in the billions. Modern automatic baking machines have successfully solved the manufacturing problems that were encountered early in the development of this industry, so that now ice cream cones can be made in enormous quantities and at low cost. But the problem of breakage in handling and shipping has never been satisfactorily solved until the development of the present invention and that of my co-pending application, Ser. No. 5,374, filed February 7, 1935, although numerous attempts have been made to do so, involving both the structural shape of the cones and the packages.

The principal causes in the breakage of ice cream cones is their wedging and sticking together when they are nested together to form a "stick" of cones. The sides of the cones being tapered cause them to wedge together so that the outer cones may split or the cones stick so tightly that one or more may be broken when they are separated by the dealer. Another large cause of breakage is that the top edge or mouth of the cone readily crumbles and, since it is the largest part of the cone, it always comes in contact with the box or container and is subject to direct blows or shock. The result is that many cones are found with broken tops when the package is opened and therefore are useless.

Usually ice cream cones are baked slightly thicker at the top edge than throughout the body of the cones, but the tops cannot be made thick enough to give the necessary strength, because, then the top will be too thick to bake fully without burning or over-baking the body of the cone.

In the present invention, I first increase the thickness of the cone at the top to give the requisite strength and then remove or spread parts of the dough or batter to form a trussed or structural shape to the top that preserves all the strength of the thickened top, yet reduces the actual thickness of the component parts or walls to such dimensions that they will bake uniformly with the side walls of the cone. In addition to the strong top, I also provide an external bead or ring on the cone which is adapted to enter within a short cylindrical opening or neck of another cone and rest on an inwardly extending annular shoulder to hold the nested cones out of wedging engagement. I have thus provided in a single cone, means for preventing breakage or crumbling of the top of the cone and wedging or sticking of two cones together.

I show in the accompanying drawing one form that my present invention may take and have the above noted and other advantages wherein.

Figure 1:
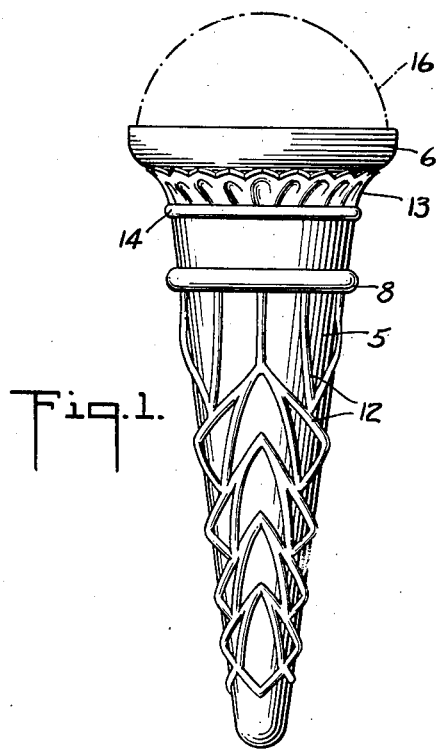
Fig. 1 is a side elevation of my invention embodied in an ice cream cone.

In the form of my invention illustrated, the body 5 of the cone is conical in shape and at the top flares outwardly to form a thickened top which is divided by shallow recesses 11 into an outer ring or mouth 6 and an inner upstanding ring or lip 7 connected by the ribs 10 that form the ends of the recesses 11. It will be noted that the mouth 6, lip 7, and ribs 10 are all of such thickness that they will bake uniformly with the body 5. Also the width of the recesses 11 is shown about equal to the thickness of the mouth and lip, but this dimension can be varied, it being essential only that it be wide enough so as to separate the dough in the thickened top into the two upstanding portions (mouth and lip) of such thickness that they can be baked while the body of the cone is being baked. The lip 7 is shown substantially cylindrical on the inside and its inside diameter is about equal to the outside diameter of the top of the conical body 5, so that an interior annular shoulder 9 is formed where the two join, which is also the lower extremity of the thickened top. Near the top of the cone, spaced at the proper distance from the top, as determined by the design and dimensions of the cone, is a bead 8 which may be a continuous ring or a number of projections spaced circumferentially of the cone. This bead is very slightly smaller than the inside diameter of the lip 7 and is adapted to rest on the interior shoulder 9 when the cones are nested together as in Fig. 2 which prevents the tapered bodies of the cones from engaging with a wedging action.

The ribs 10 form struts that brace or strengthen the outer ring 6 against the inner portion 7 so that the top of the cone is substantially as strong as though it were as thick as the space including the outer and inner portions 6 and 7. The tops of the ribs 10 extend from the top of the portion 7 to the top of the portion 6, which not only braces and strengthens their top edges, but the ribs also serve as vents to permit the escape of steam and gases from the part of the mold that forms the inner part 7 of the cone. The recesses 11 also serve as vacuum cups into which the cream is pressed when the serving 15, 16 is placed on top of the cone. The recesses or cups are so effective in this respect that a filled cone may be turned upside down and the cream will not fall off. This prevents the loss of the serving of ice cream when a filled cone is tilted on its side either through carelessness or by a child while eating it.

The outer surface of the cone may be ornamented as shown at 12, 13 in any suitable design and the space between the bead 8 and a smaller bead 14 provides a suitable space for the trade name or brand of the cone.

Figure 2:
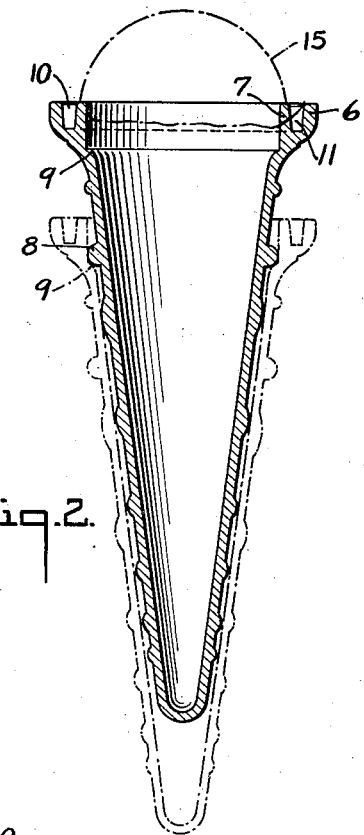
Fig. 2 is a longitudinal sectional view showing how wedging and sticking of the cones is prevented.
Figure 3:
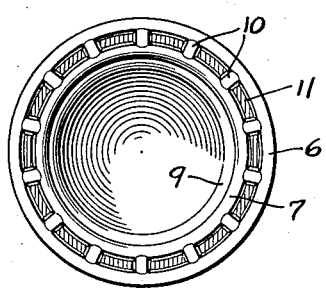
Fig. 3 is a top plan view of Fig. 1.

As shown in dotted lines in Fig. 2, the inner mouth or lip 7 will support a small ball of cream 15, as say from a No. 30 dipper, while as indicated at 16 in Fig. 1, a large ball, as from a No. 20 dipper, may be served on the same cone.

My new cup pastry may of course be made in any size or style, including "straight" cones, "cup" cones, multi-top cones, truncated cones and other styles of cup pastry adapted to take round, rectangular or other shaped servings of cream or other foods.

Having thus described one form that my invention may take, I claim all equivalents and modifications thereof that may come within the scope of the following claims:

1. A pastry cup comprising a hollow handle portion of substantially uniform thickness, a top portion of greater thickness and greater size than said handle portion formed integral therewith, said top portion having a number of spaced narrow recesses in its upper edge dividing it into an inner continuous lip and an outer continuous mouth connected by ribs, the tops of the ribs being substantially continuous with the tops of the lip and mouth.

2. A pastry cup comprising a hollow handle portion of substantially uniform thickness, a top portion of greater thickness and greater size than said handle portion formed integral therewith, said top portion having a number of spaced narrow recesses in its upper edge dividing it into an inner continuous lip and an outer continuous mouth connected by ribs, the tops of the ribs being substantially continuous with the tops of the lip and mouth, the top portion being cylindrical on the inside and its inside diameter being substantially equal to the outside diameter of the top of the handle portion whereby an inner annular shoulder will be provided at the junction of the top portion and the handle portion.

3. A pastry cup of the character described comprising a hollow body portion, a top portion of greater thickness than said body portion and integrally secured to the upper end thereof and including a continuous mouth of greater size than said body and projecting outwardly therefrom and a continuous inner lip spaced from the mouth, ribs bridging the space between said mouth and lip to define relatively shallow recesses, whereby to strengthen said top and to retain the contents of said cup.

4. A pastry cup of the character described comprising a hollow body portion, a top of greater thickness than said body portion and integrally secured to the upper end thereof and including a continuous mouth of greater size than said body projecting outwardly therefrom, a lip disposed within the mouth and spaced therefrom, and ribs bridging the space between said mouth and lip to define recesses, the upper edges of said ribs extending at least substantially as high as said lip, whereby to strengthen said top and prevent removal of the contents of the cup.

5. A pastry cup of the character described comprising a hollow body portion, a top of greater size and thickness than said body integrally secured to and overhanging said body, said top including a continuous outer rim, an inner rim disposed within and spaced from said outer rim, the upper extremity of said outer rim being at least as high as said inner rim, and partition elements bridging said inner rim and outer rim to define recesses, whereby to strengthen said top and retain the contents of said cup.

FRANCIS W. TURNBULL.